United States Patent
Hegenbart et al.

(10) Patent No.: US 12,006,021 B2
(45) Date of Patent: Jun. 11, 2024

(54) STRUCTURE AND EQUIPMENT SYSTEM FOR INSTALLATION IN AN AIRCRAFT

(71) Applicant: Airbus Operations GmbH, Hamburg (DE)

(72) Inventors: Matthias Hegenbart, Hamburg (DE); Pierre Zahlen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 112 days.

(21) Appl. No.: 17/940,067

(22) Filed: Sep. 8, 2022

(65) Prior Publication Data
US 2023/0105251 A1 Apr. 6, 2023

(30) Foreign Application Priority Data
Sep. 30, 2021 (EP) .................................... 21200104

(51) Int. Cl.
| | | |
|---|---|---|
| *B64C 1/20* | (2006.01) | |
| *B64C 1/06* | (2006.01) | |
| *B64D 9/00* | (2006.01) | |
| *B64F 5/10* | (2017.01) | |

(52) U.S. Cl.
CPC ............... *B64C 1/20* (2013.01); *B64C 1/061* (2013.01); *B64D 9/00* (2013.01); *B64F 5/10* (2017.01); *B64D 2009/006* (2013.01); *B64D 2221/00* (2013.01)

(58) Field of Classification Search
CPC .. B64C 1/20; B64C 1/061; B64D 9/00; B64D 2221/00; B64F 5/10
See application file for complete search history.

(56) References Cited

U.S. PATENT DOCUMENTS

| | | | |
|---|---|---|---|
| 2010/0031509 A1* | 2/2010 | Frauen ...................... | B64F 5/10 |
| | | | 29/897.2 |
| 2021/0188417 A1* | 6/2021 | Maurel .................... | B64C 1/061 |
| 2021/0188445 A1* | 6/2021 | Feuillerac ................ | H02G 3/30 |

FOREIGN PATENT DOCUMENTS

| | | |
|---|---|---|
| DE | 102009056593 A1 | 6/2011 |
| EP | 3838743 A1 | 6/2021 |
| WO | 2021122322 A1 | 6/2021 |

OTHER PUBLICATIONS

European Search Report; priority document.

* cited by examiner

*Primary Examiner* — Tye William Abell
(74) *Attorney, Agent, or Firm* — Greer, Burns & Crain, Ltd.

(57) ABSTRACT

A structure and equipment system installed in an aircraft includes vertical supports, a rail device, a connector, guiding elements, pivot joints, and locking devices. The rail device is arranged on the aircraft to guide the guiding elements along a rail device extension axis. Via the connector, the vertical supports are arranged in parallel and connect to form a grid arrangement with the guiding elements arranged thereon. The pivot joints are attached to upper ends of the vertical supports to pivot them. The locking devices each have a first and a second locking element. The grid arrangement is inserted into the aircraft as far as an installation position via the guiding elements on the rail device with vertical supports pivoted upwards from the vertical, by pivoting down into a vertical orientation, the first locking elements can interlock with correspondingly arranged second locking elements to form a load-bearing support structure.

15 Claims, 3 Drawing Sheets

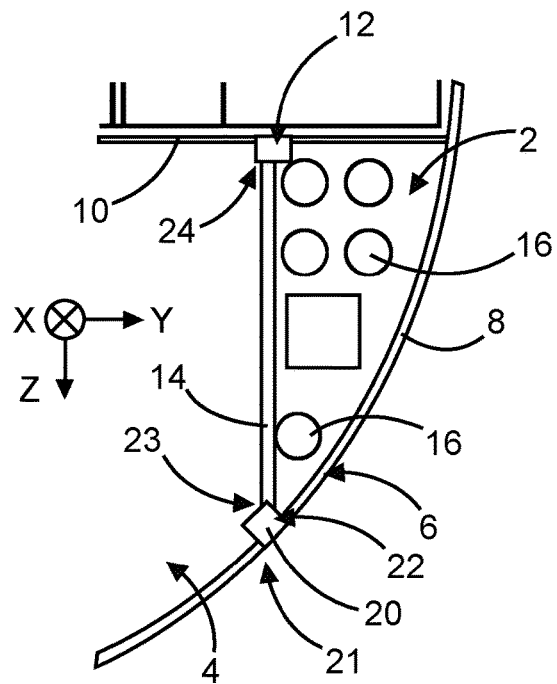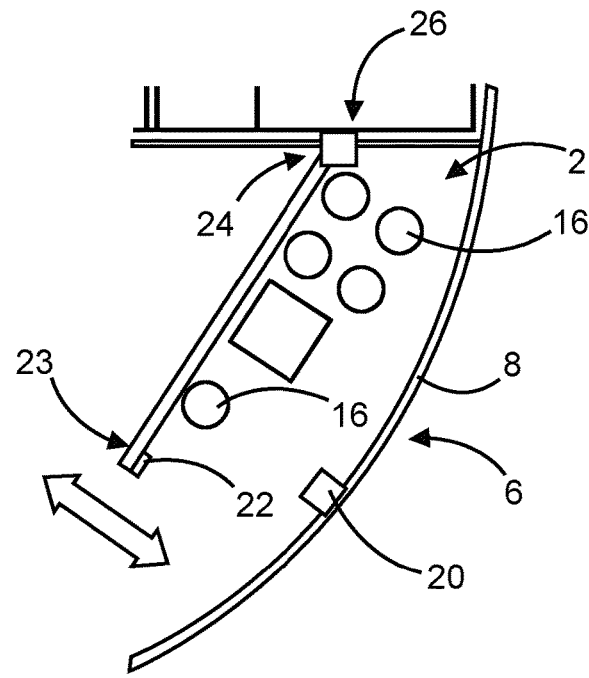
Fig. 1a Fig. 1b
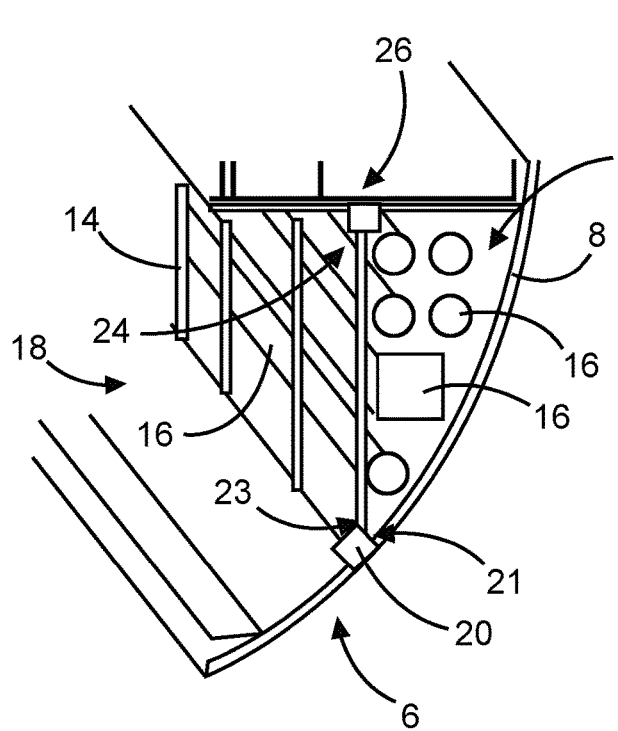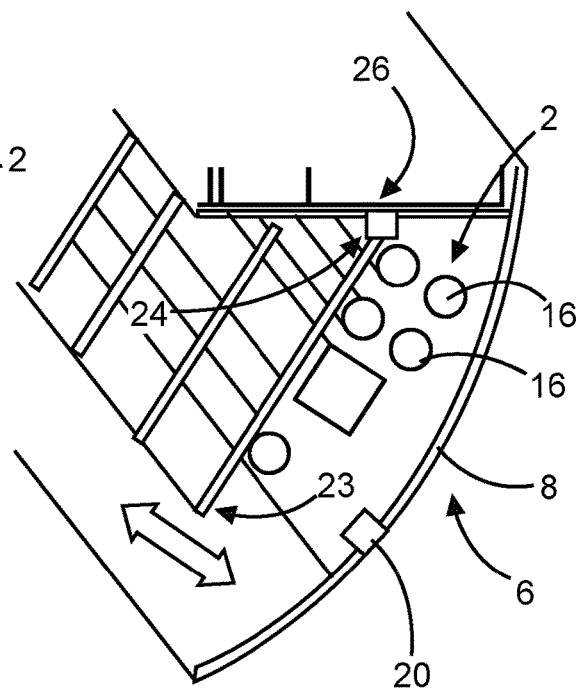
Fig. 1c Fig. 1d

STRUCTURE AND EQUIPMENT SYSTEM FOR INSTALLATION IN AN AIRCRAFT

CROSS-REFERENCES TO RELATED APPLICATIONS

This application claims the benefit of the European patent application No. 21200104.4 filed on Sep. 30, 2021, the entire disclosures of which are incorporated herein by way of reference.

FIELD OF THE INVENTION

The present description relates to a structure and equipment system for installation in an aircraft, to an aircraft and to a method for producing a load-bearing structure.

BACKGROUND OF THE INVENTION

During the final assembly of an aircraft, structural components and equipment components are conventionally handled and installed manually. For example, for underfloor regions, vertical supports are individually carried into a fuselage, manually oriented therein and connected to connecting elements on crossbars and frames. At the same time, equipment components which are connected to the vertical supports or extend directly next to the supports, are also fastened piece by piece. Due to the size of an aircraft and the complexity of the equipment, the final assembly is an elaborate process.

WO2021122322A1 shows a component system for the internal equipment of an aircraft, comprising at least one equipment component, a plurality of component rails, a plurality of guiding elements which can be brought into engagement with the component rails and can be moved relative to the component rails, a plurality of retaining members which are connected to the guiding elements and are designed to be coupled to a fuselage structure of the aircraft or the at least one equipment component, and a plurality of fixing units which are arranged on the component rails and are designed to fix the guiding elements to a respective component rail. At least two of the component rails are arranged on the at least one equipment component or the fuselage structure parallel to and at a distance from one another so that the equipment components can be inserted by means of the component rails on guiding elements or component rails that are spatially held in the aircraft and can be fixed in an inserted position by the fixing units.

SUMMARY OF THE INVENTION

It can be considered an object of the invention to provide a system or a method by which a structure can be assembled in a simplified manner.

A structure and equipment system for installation in an aircraft is proposed, comprising a plurality of vertical supports, a rail device, at least one connector, a plurality of guiding elements, a plurality of pivot joints, and a plurality of locking devices, wherein the rail device can be attached to a structure of the aircraft and is designed to guide the guiding elements along an axis of extension of the rail device and, in so doing, move them relative to the structure, wherein by means of the at least one connector, the vertical supports are arranged parallel to and at a distance from one another and are connected to form a grid arrangement, wherein the guiding elements are arranged on a grid arrangement, wherein the pivot joints can be attached to upper ends of the vertical supports and are designed to pivot the vertical supports about the upper end thereof, wherein the locking devices each have a first locking element which is arranged at a lower end of a vertical support and can be locked in a second locking element that can be positioned on the structure, and wherein the grid arrangement can be inserted as far as an installation position in the structure of the aircraft by means of the guiding elements on the rail device with vertical supports pivoted upwards from the vertical, by pivoting down into a vertical orientation, the first locking elements can interlock with correspondingly arranged second locking elements so that a load-bearing support structure can be formed thereby.

The vertical supports are provided to support in particular floor supports vertically on the structure of the aircraft. It is conceivable for the vertical supports to extend vertically downwards from a lateral region of a floor crossbar at a distance from the outer skin of the fuselage and to be connected to a frame there. This thus results in a triangular structure which is known in particular for commercial aircraft and is enclosed between the fuselage outer skin, a hold and a passenger cabin. The vertical supports are often produced from a fiber-reinforced plastics material, in particular carbon-fiber-reinforced plastics material.

The rail device is provided at least temporarily for the installation of the vertical supports on the structure. The rail device could form for example a rail which extends parallel to a longitudinal axis of the fuselage and is arranged for example on floor crossbars. In this case, the rail device could have a hollow cross section in which guiding elements can be guided. However, there could also be a cross section which is formed correspondingly on the outer face thereof and makes it possible to receive and guide the guiding elements.

The guiding elements are to be adapted to the rail device. It could be based for example on a sliding guide so that the guiding elements are slidable and have two or more boundary faces which engage with a corresponding sliding surface of the rail device. However, rolling elements and, in particular, rollers which can roll along the rail device are also conceivable. The aim is to be able to slide the grid arrangement from outside the fuselage into the fuselage and move it into a provided installation position therein. Depending on the size of the aircraft, this could be a considerable stretch, and therefore the guiding elements and the rail device should allow easy movement.

The grid arrangement comprises a plurality of vertical supports which are arranged parallel to one another and enclose a distance to one another. In this case, the distance should correspond to the grid dimension of frame fields or another grid dimension when the structure does not include any frames. Consequently, as prepared outside the fuselage, the grid arrangement can be pivoted from an upwardly pivoted position into a vertical in order to correspond to the positions of frames or similar reinforcing elements.

The locking devices are provided for fastening the lower ends of the vertical supports. These devices comprise two locking elements which can engage with one another, in particular, an in interlocking manner By pivoting a vertical support having a first locking element arranged at the lower end, this first locking element can move closer to the second locking element and then engage therein. When using a plurality of first locking elements, in particular a first locking element on each vertical support, all the vertical supports can engage in or interlock with a second locking element. The previously mentioned triangular structure is thereby produced automatically. The lower ends of the vertical supports can be fixed preferably in all spatial directions by the locking devices.

In this case, the grid arrangement requires the at least one connector which is intended to hold the individual vertical supports in the spacing thereof. For this purpose, dedicated components can be used which can be removed again for example directly after pivoting down the vertical supports. Alternatively, required fittings that have an elongate extension and extend in the triangular structure would also be conceivable. For this purpose, for example installation conduits, media conduits and the like are considered. These can be used as a connector when producing the grid arrangement in order to place the vertical supports correspondingly to one another.

Furthermore, it is particularly preferable for the vertical supports to be connected in a structurally fixed manner at the upper ends thereof. This means that the upper ends of the vertical supports are blocked in all degrees of freedom. For this purpose, the pivot joints could be formed correspondingly, that is to say, they block or fix immediately after the grid arrangement is pivoted so that the upper end of the vertical supports is structurally fixed. However, other variants are also certainly conceivable, for example by means of a bolt which is actuated over the length of the rail device. Split pin or screw locking devices would also be possible.

The structure and equipment system according to the invention means that a load-bearing support structure can be produced quickly and precisely, during which production the time taken for installation inside a fuselage of an aircraft is considerably reduced, and the installation work is simplified.

The guiding elements could be lockable to the rail device. After the locking, the guiding elements can therefore no longer be moved along the rail device. The position thereof relative to the structure is thus fixed. The locking can be carried out by a screw connection, a locking pin or the like.

The guiding elements could be in the form of rollers. The rollers can be formed in such a way that they roll in the rail device in as clearance-free a manner as possible so that they could remain in the rail device permanently. It is additionally conceivable to mount the rollers on individual vertical supports by means of an axle, and to fix the axles to the rail device after the installation of the grid arrangement.

The rail device could comprise a track having a plurality of rail portions. The rail portions allow a simplified installation of the rail device, since the rail portions follow one another end face to end face and can be added to or extended as desired. The rail portions can have, in particular, a constant profile cross section and can be produced, for example, by extrusion. Therefore, they are preferably simple profile components.

The rail portions could be fastened to the structure at a distance from the end faces of one another and can be removed from the structure of the aircraft when the grid arrangement is inserted. The rail portions can be dimensioned in such a way that they are easy to handle so that they can be removed piece by piece, even when the grid arrangement is in position. It is conceivable for the rail portions to have a length which is slightly less than the distance between two guiding elements. Thus, one rail portion could be provided for each pair of guiding elements.

The rail device could remain on the structure of the aircraft when the support structure is produced. The rail device therefore takes over the introduction of the load from the vertical supports into the structure of the aircraft via the guiding elements. At this point, it could be particularly advantageous, as shown previously, to be able to fix the guiding elements in the rail device.

Furthermore, the structure and equipment system could comprise an electric contact rail that can be fastened to the structure to transmit electrical power and/or data and at least one consumer which is slidably mounted in the contact rail and can be connected to at least one component that can be fastened to the grid arrangement. The electric contact rail makes it very simple to connect consumers for electrical power or data. The consumer could be slidably mounted in the electric contact rail as well as a guiding element. The contact rail could have two or more conductors on an inner and/or outer surface which are connected to an on-board system and can be contacted along the entire contact rail. The consumer is designed correspondingly thereto and thus has sliding elements or the like on an outer and/or inner surface and can be connected to the corresponding load via a conduit. It is of course conceivable for a plurality of consumers to be arranged in the contact rail at the same time and to connect a plurality of loads to electrical power and/or data.

The electric contact rail could be integrated in the rail device. The electric contact rail could be integrated in a guide profile of the rail device, for example in an inner cavity of the rail device. However, they could also adjoin or be connected to an outer cross section. When inserting the grid arrangement, a connection to the electric contact rail takes place at the same time.

The structure and equipment system could further comprise at least one cover panel which is arranged on the grid arrangement. The cover panel could be a wall covering and could be fastened to an inward-facing side of the grid arrangement. It is conceivable for the at least one cover panel to form the at least one connector.

The at least one connector could have a supply conduit which is arranged on a laterally outwardly directed side of the support structure. The supply conduit could be a fluid conduit or an electrical conduit. If this conduit is sufficiently rigid, it can be readily used to temporarily create a grid arrangement to carry out the procedure shown previously.

The invention further relates to an aircraft, comprising a fuselage formed by a structure and at least one structure and equipment system according to the preceding description, wherein the structure and equipment system is positioned in the fuselage and connected to the structure.

Furthermore, analogously to the preceding embodiments, the invention relates to a method for producing a load-bearing support structure, comprising the steps of connecting a plurality of vertical supports arranged parallel to and at a distance from one another, by means of at least one connector, to form a grid arrangement, attaching a rail device to a structure of an aircraft, suspending the grid arrangement by means of a plurality of guiding elements on the rail device so that the grid arrangement hangs down from the rail device, inserting the grid arrangement as far as an installation position by means of the guiding elements on the rail device, orienting the grid arrangement by pivoting about pivot joints at upper ends of the vertical supports in such a way that the vertical supports are arranged vertically, and connecting the vertical supports to the structure by locking first locking elements, which are arranged at lower ends of the vertical supports, to second locking elements arranged on the structure so that a load-bearing support structure is formed thereby.

The method could further comprise fixing the guiding elements to the rail device.

The method could further comprise, following the connection of the vertical supports, removing rail portions between the individual guiding elements. The method could further comprise arranging at least one electrical load on the grid arrangement and connecting, by means of a conduit, to an electrical consumer before the suspension in the rail device, and sliding the consumer in an electric contact rail integrated in the rail device when sliding the grid arrangement to produce an electrical connection of the at least one electrical load in the installation position.

BRIEF DESCRIPTION OF THE DRAWINGS

Exemplary embodiments will be described in greater detail in the following with reference to the accompanying drawings. The drawings are schematic and not true to scale. Like reference signs relate to identical or similar elements. In the drawings:

FIGS. 1a to 1d show a structure and equipment system in a fuselage of an aircraft in a plurality of schematic views.

DETAILED DESCRIPTION OF THE PREFERRED EMBODIMENTS

Figure 2:
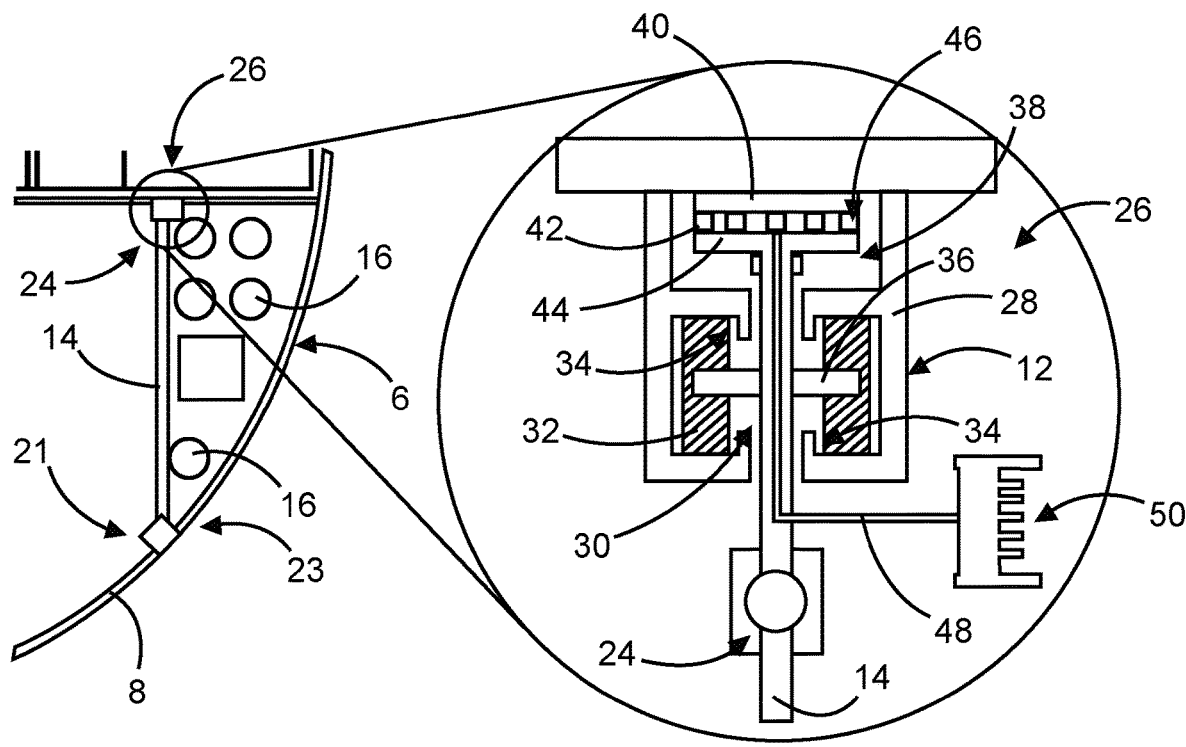
FIG. 2 is a schematic view of an upper part of a vertical support.

FIGS. 1a to 1d show a structure and equipment system 2 in different views. Part of a fuselage 4 of an aircraft having a structure 6 can be seen here. This includes frames 8 and floor crossbars 10 extending on the frames 8 in the transverse direction. A rail device 12 which extends along a longitudinal axis x is arranged on a lower face of floor crossbars 10 at a lateral distance from the frames 8. Vertical supports 14 which extend vertically in FIGS. 1a and 1c, that is to say, in the Z direction downwards from the rail device 12, are held thereon.

As can be seen in FIGS. 1c and 1d, a plurality of vertical supports 14 are arranged parallel to and at a distance from one another and are connected by means of a connector 16 to form a grid arrangement 18. The connector 16 could be a dedicated connector or a media conduit which is to be installed in this region of the fuselage 4 anyway. In FIGS. 1b and 1d, the process of connecting the vertical supports 14 or the grid arrangement 18 to the structure is shown. In this case, the grid arrangement 18 is pivoted upwards slightly out of the vertical so that it extends obliquely to the Z axis. The structure and equipment system 2 makes it possible to place the grid arrangement 18, in a slightly upwardly pivoted position, into the fuselage 4 in a desired installation position along the longitudinal axis X, by sliding along the rail device 12.

On the structure 6 and in particular on the frames 8, second locking elements 20 are arranged which correspond to first locking elements 22 at a lower end 23 of the vertical supports 14 or the grid arrangement 18. By pivoting the grid arrangement 18 down into the vertical, the first locking elements 22 can be connected to the second locking elements 20 of a locking device 21, for example can lock together in an interlocking manner.

In order to pivot the vertical supports 14 or the grid arrangement 18, pivot joints 24 are arranged at upper ends of the vertical supports, as shown in FIG. 2. An upper end 26 of a vertical support 14 or the grid arrangement 18 is shown here. At the upper end 26, the rail device 12 which comprises a rail profile 28 is located. The rail profile 28 has a first cavity 30 in which two or more rollers 32 are guided as guiding elements. The first cavity 30 additionally has boundary edges 34 which are provided to mount the rollers 32 in as clearance-free a manner as possible in the first cavity 30 so as to be slidable along the X axis. For this purpose, for example two rollers 32 arranged side-by-side in the Y direction are interconnected by means of an axle 36 which extends for example through a plane spanned by the grid arrangement 18.

Above the first cavity 30, a second cavity 38 is formed which comprises an electric contact rail 40. In this case, a plurality of electrical conductors 42 are provided which can be electrically tapped by a consumer 44. The electric contact rail 40 extends preferably along the entire rail device 12. Consumers 33 which each have sliding contacts 46 can be arranged at any desired points. From the relevant consumer 44, a conduit 48 leads to a connector 50 which can be connected to a load.

Underneath the rail device 12, the pivot joints 24 are arranged, which are directly adjoined in each case by a vertical support 14. The locking device 21 at the lower end 23 of the vertical supports 14 for fixing the relevant vertical support 14 is shown in greater detail in FIG. 3.

Figure 3:
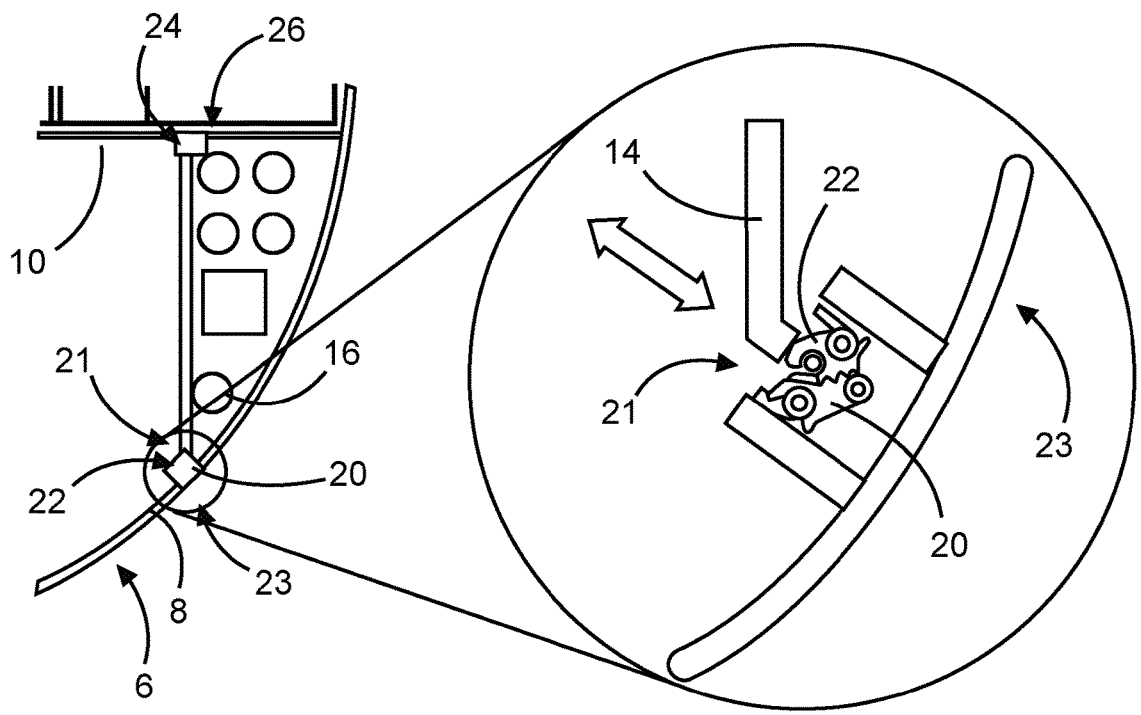
FIG. 3 is a schematic view of a lower part of a vertical support.

FIG. 3 shows the first locking element 22 in engagement with the second locking element 20. These two locking elements interlock with one another so that they can transmit the load produced on the relevant vertical support in the Z and Y direction into the structure 6.

Figure 4:
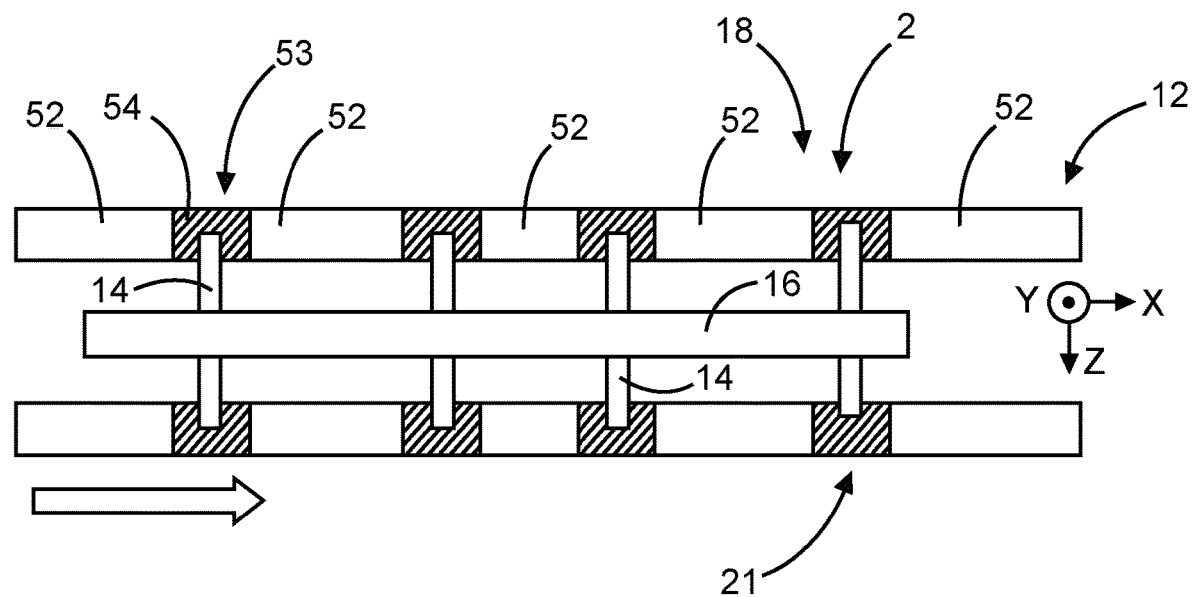
FIG. 4 is a schematic side view of an installed structure and equipment system.

FIG. 4 is a side view of the structure and equipment system 2 when assembled. In this case, the viewing direction is directed from a frame 8 towards the grid arrangement 18. The rail device 12 has a plurality of rail portions 52, on which guiding elements 54, for example the rollers 32 shown previously, are slidably mounted. An aircraft-fixed coordinate system is shown. The X axis represents a longitudinal axis of the aircraft in which the structure and equipment system 2 is mounted. An installation direction, i.e., an insertion direction, is parallel to the X axis.

The guiding elements 54 are fixed, for example, in the rail device 12 so that they are no longer able to move therein. The rail portions 52 between fixed guiding elements 54 can optionally be removed or remain on the structure 6. Should the portions 52 be removed, it is necessary to correspondingly fix the guiding elements 54 to the structure 6 is required. It is conceivable for only rail portions 52 between the guiding elements 54 to be removed, and narrower rail portions 53 to remain on the structure 6 to hold the guiding elements 54.

Figure 5:
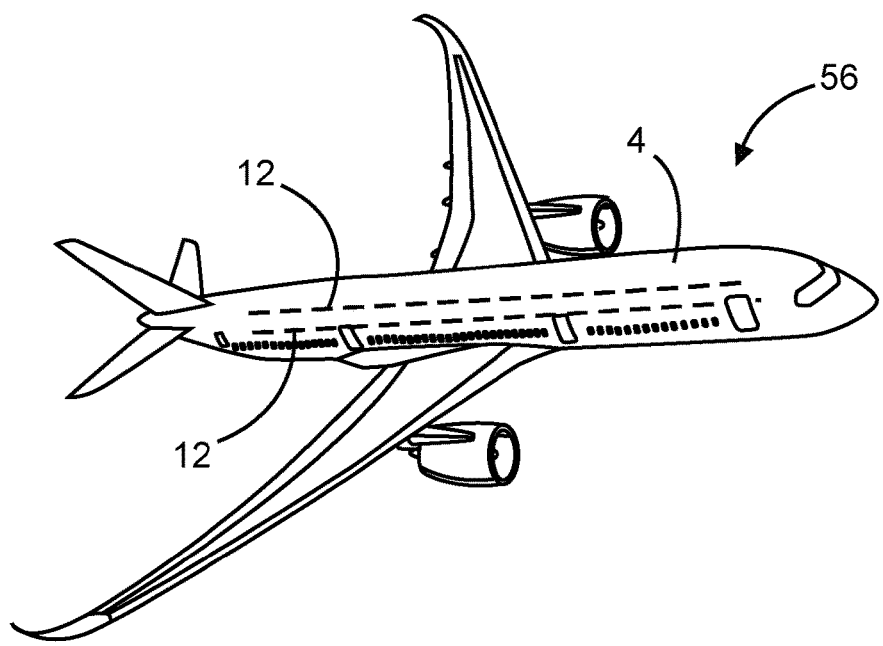
FIG. 5 shows an aircraft.

Lastly, FIG. 5 shows an aircraft 56 comprising the fuselage 4 and a structure and equipment system 2 according to the indicated dashed lines, which each indicate a rail device 12, installed therein. These are provided in an underfloor region.

In addition, it should be noted that "comprising" does not exclude any other elements or steps, and "one" or "a/an" does not exclude a plurality. Furthermore, it should be noted that features or steps which have been described with reference to one of the above exemplary embodiments can also be used in combination with other features or steps of other exemplary embodiments described above. Reference signs in the claims are not to be considered a restriction.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 2 structure and equipment system
4 fuselage
6 structure
8 frame
10 floor crossbeam
12 rail device
14 vertical support
16 connector
18 grid arrangement
20 second locking element
21 locking device
22 first locking element
23 lower end
24 pivot joint
26 upper end
28 rail profile
30 first cavity
32 roller
34 boundary edge
36 axle
38 second cavity
40 electric contact rail
42 conductor
44 consumer
46 sliding contact
48 conduit
50 connector
52 rail portion
53 rail portion
54 guiding element
56 aircraft

The invention claimed is:

1. A structure and equipment system for installation in an aircraft, comprising:
a plurality of vertical supports,
a rail device,
at least one connector,
a plurality of guiding elements,
a plurality of pivot joints, and
a plurality of locking devices,
wherein the rail device is configured to be attached to a structure of the aircraft and is configured to guide the guiding elements along an axis of extension of the rail device and, in so doing, move them relative to the structure,
wherein by means of the at least one connector, the vertical supports are arranged parallel to and at a distance from one another and are connected to form a grid arrangement,
wherein the guiding elements are arranged on the grid arrangement,
wherein the pivot joints are configured to be attached to upper ends of the vertical supports and are configured to pivot the vertical supports about the upper ends thereof,
wherein the locking devices each have a first locking element which is arranged at a lower end of a vertical support and is configured to be locked in a second locking element which can be positioned on the structure, and
wherein the grid arrangement are configured to be inserted into the structure of the aircraft into an installation position with the guiding elements on the rail device with vertical supports pivoted upwards from the vertical, by pivoting down into a vertical orientation, the first locking elements are configured to interlock with correspondingly arranged second locking elements so that a load-bearing support structure can be formed thereby.

2. The structure and equipment system according to claim 1, wherein the guiding elements can be lockable to the rail device.

3. The structure and equipment system according to claim 1, wherein the guiding elements are formed as rollers.

4. The structure and equipment system according to claim 1, wherein the rail device remains on the structure of the aircraft when the support structure is produced.

5. The structure and equipment system according to claim 1, further comprising at least one cover panel which is arranged on the grid arrangement.

6. The structure and equipment system according to claim 1, wherein the at least one connector has a supply conduit which is arranged on a laterally outward-facing side of the support structure.

7. The structure and equipment system according to claim 1, wherein the rail device comprises a track having a plurality of rail portions.

8. The structure and equipment system according to claim 7, wherein the rail portions can be fastened to the structure at a distance from end faces of one another and can be removed from the structure of the aircraft when the grid arrangement is inserted.

9. The structure and equipment system according to claim 1, further comprising
an electric contact rail which can be fastened to the structure to transmit at least one of electrical power or data, and
at least one consumer which is slidably mounted in the contact rail and is configured to be connected to at least one component that can be fastened to the grid arrangement.

10. The structure and equipment system according to claim 9, wherein the electric contact rail is integrated in the rail device.

11. An aircraft, comprising a fuselage formed by a structure and at least one structure and equipment system according to claim 1, wherein the structure and equipment system is positioned in the fuselage and connected to the structure.

12. A method for producing a load-bearing support structure, comprising the steps of:
connecting a plurality of vertical supports arranged parallel to and at a distance from one another, by means of a connector, to form a grid arrangement, attaching a rail device to a structure of an aircraft,
suspending the grid arrangement by means of a plurality of guiding elements on the rail device so that the grid arrangement hangs down from the rail device, inserting the grid arrangement into an installation position with the guiding elements on the rail device, orienting the grid arrangement by pivoting about pivot joints at upper ends of the vertical supports such that the vertical supports are arranged vertically, and connecting the vertical supports to the structure by locking first locking elements, which are arranged at lower ends of the vertical supports, to second locking elements arranged on the structure, so that a load-bearing support structure is formed thereby.

13. The method according to claim 12, further comprising fixing the guiding elements to the rail device.

14. The method according to claim 12, further comprising, following a connection of the vertical supports, removing rail portions between individual ones of the guiding elements.

15. The method according to claim 12, further comprising arranging at least one electrical load on the grid arrangement and connecting, by means of a conduit, to an electrical consumer before a suspension in the rail device, and sliding the electrical consumer in an electric contact rail integrated in the rail device when sliding the grid arrangement to produce an electrical connection of the at least one electrical load in the installation position.

* * * * *